(12) United States Patent
Ludwig (10) Patent No.: US 11,156,046 B2
(45) Date of Patent: Oct. 26, 2021

(54) METHOD FOR REDUCING STICK-SLIP LOGGING TOOLS

(71) Applicant: Halliburton Energy Services, Inc., Houston, TX (US)

(72) Inventor: Wesley Neil Ludwig, Fort Worth, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 23 days.

(21) Appl. No.: 16/668,734

(22) Filed: Oct. 30, 2019

(65) Prior Publication Data

US 2021/0131208 A1 May 6, 2021

(51) Int. Cl.
*E21B 23/14* (2006.01)
*E21B 49/00* (2006.01)
*G01V 3/20* (2006.01)
*E21B 47/12* (2012.01)
(Continued)

(52) U.S. Cl.
CPC .............. *E21B 23/14* (2013.01); *E21B 23/00* (2013.01); *E21B 47/002* (2020.05); *E21B 47/12* (2013.01); *E21B 49/00* (2013.01); *G01V 3/20* (2013.01); *E21B 23/001* (2020.05)

(58) Field of Classification Search
CPC ........ E21B 23/00; E21B 47/002; E21B 49/00; E21B 23/001; E21B 23/14; E21B 47/12; G01V 3/20
See application file for complete search history.

(56) References Cited

U.S. PATENT DOCUMENTS 7,770,667 B2 * 8/2010 Moore ...................... E21B 4/04
175/98
8,028,766 B2 * 10/2011 Moore ...................... E21B 4/04
175/98
(Continued)

FOREIGN PATENT DOCUMENTS

WO 2004086091 A2 10/2004
WO 2013101426 A1 7/2013

OTHER PUBLICATIONS

Sheiretov; "Wireline Tractors and Mechanical Services Tools: Comparative Study of Technical Solutions"; Society of Petroleum Engineers; SPE-179044-MS; Mar. 2016; 21 pgs.

*Primary Examiner* — Nicole Coy
(74) *Attorney, Agent, or Firm* — John W. Wustenberg; Parker Justiss, P.C.

(57) ABSTRACT

The disclosure provides a method of obtaining logging data of subterranean formations and a logging system for doing the same. One example method includes: (1) conveying a logging tool and downhole tractor through a gravity-conveyed section of a borehole, and (2) obtaining logging data from the logging tool during the conveying, wherein the downhole tractor is employed for at least a portion of the obtaining of the logging data. Another example method includes: (1) lowering a logging tool and an open-hole tractor through a gravity conveyed section of an open borehole, (2) raising the logging tool and the open-hole tractor through the gravity conveyed section, (3) obtaining, from the logging tool during the raising, logging data associated with the gravity conveyed section of the open borehole, and (4) employing the open-hole tractor for at least a portion of the raising of the logging tool during the obtaining.

20 Claims, 3 Drawing Sheets

(51) Int. Cl.
*E21B 23/00* (2006.01)
*E21B 47/002* (2012.01)

(56) References Cited

U.S. PATENT DOCUMENTS

| | | | |
|---|---|---|---|
| 8,443,915 B2* | 5/2013 | Storm, Jr. | E21B 23/14 |
| | | | 175/40 |
| 9,002,648 B2* | 4/2015 | Pfutzner | G01V 7/06 |
| | | | 702/6 |
| 9,376,908 B2* | 6/2016 | Ludwig | E21B 47/017 |
| 2011/0185806 A1 | 8/2011 | Pfutzner | |
| 2014/0174725 A1 | 6/2014 | Dalvi et al. | |
| 2014/0238670 A1 | 8/2014 | Pop et al. | |
| 2018/0267194 A1* | 9/2018 | San Martin | G01V 3/20 |
| 2020/0399968 A1* | 12/2020 | Ludwig | E21B 23/14 |

* cited by examiner

METHOD FOR REDUCING STICK-SLIP LOGGING TOOLS

BACKGROUND

Production and injection well systems are formed by drilling boreholes through a subterranean formation. Gathering information about the subterranean formations surrounding the borehole is important for controlling and monitoring well system operations. Borehole measurements can be obtained using different imaging tools deployed in the boreholes via various conveyances, such as a wireline. The imaging tools are typically gravity conveyed in the borehole and winched back to the surface. During the ascent, the imaging tools obtain the images for the imaging logs.

SUMMARY

The disclosure provides a method of obtaining logging data of subterranean formations associated with a borehole. In one example, the method includes: (1) conveying a logging tool and downhole tractor through a gravity-conveyed section of a borehole, and (2) obtaining logging data from the logging tool during the conveying, wherein the downhole tractor is employed for at least a portion of the obtaining of the logging data.

The disclosure also provides a method of obtaining logging data in an open borehole. In one example, this method includes: (1) lowering a logging tool and an open-hole tractor through a gravity conveyed section of an open borehole, (2) raising the logging tool and the open-hole tractor through the gravity conveyed section, (3) obtaining, from the logging tool during the raising, logging data associated with the gravity conveyed section of the open borehole, and (4) employing the open-hole tractor for at least a portion of the raising of the logging tool during the obtaining.

The disclosure further provides a logging system for gravity-conveyed sections of a borehole. In one example, the logging system includes: (1) a logging tool configured to obtain logging data from a gravity-conveyed section of a borehole, (2) a downhole tractor connected to the logging tool, (3) a logging cable coupled to the logging tool and the downhole tractor, and (4) a computer configured to generate images that correspond to depths of the gravity-conveyed section of the borehole by processing the logging data obtained by moving the logging tool in the gravity-conveyed section of the borehole employing both the downhole tractor and the logging cable.

BRIEF DESCRIPTION

Reference is now made to the following descriptions taken in conjunction with the accompanying drawings, in which.

DETAILED DESCRIPTION

Data obtained from downhole logging tools can be adversely impacted by non-uniform tool motion that occurs downhole when obtaining the images. The non-uniform tool motion is often due to stick-slip. Stick-slip is caused by a combination of line stretch and the variation in force to convey a logging tool through the various depths of a borehole. When the force to move the tool increases, the tension on the wireline increases and the wireline stretches. The tool may even stop movement through the borehole and stick in place until sufficient tension is built up to move the tool. The tool can then slip free, causing a sudden increase in tool speed as it moves through the borehole. This type of motion makes accurate depth control a challenge and may cause lost data at certain depths or blurred data because of excessive tool movement while data is being acquired.

For example, logging tools can be on the end of a wireline that might be 20 or 30 thousand feet deep (i.e., 6,096 or 9,144 meters) in an open borehole and have a considerable amount of stretch to it. Typically, the logging tool is lowered to the bottom of the borehole and then activated for obtaining logging data. The logging tool is then pulled uphole and collects data on a time basis for plotting at corresponding depths along the borehole to provide a log of the subterranean formation versus depth. When the ascent of the logging tool is not steady, plotting of the actual measurements versus depth can be difficult.

The logging tool can be an imaging tool with pads that are extended against the inner wall of the borehole when the tool is activated. For example, the imaging tool can be a resistivity imaging tool having pads that are spring-loaded against the inner wall of an open borehole. As the tool is pulled upwards, changes in the diameter or changes in the coefficient of friction of the inner wall of the open borehole change the amount of force to convey the tool uphole. If the force to move the tool increases, then the wireline acts as a spring that starts to stretch. Movement of the imaging tool may slow down or may stop while the wireline stretches until there is enough tension in the wireline to move the tool. Depending on how much force is needed for the move, the imaging tool might slip free and move quickly over several feet or one meter. As such, the imaging data obtained over the several feet or one meter is not measured correctly because the logging tool is moving too fast or averaging over a number of different formations as it travels through the borehole.

The disclosure provides a solution to improve capturing of data from logging tools in boreholes by eliminating the effect of, or at least reducing the effect of, stick-slip when gathering logging data. A method is disclosed to reduce the effect of stick slip on logging and other tools by employing a downhole tractor while operating the logging tool in a gravity-conveyed section of a borehole. The variation in conveyance force with depth that causes stick-slip in wireline conveyed tools can largely be handled by the downhole tractor that is connected to the logging tool. The connected downhole tractor is able to turn stick slip motion into a steady motion for movement by applying a force to move the logging tool and absorbing changes in force due to the logging tool and cable interacting with the formation. The combination of tractor conveyance with the wireline will provide much smoother tool motion through the borehole which will in turn improve the quality of the logging data that is obtained.

A gravity-conveyed section of a borehole is a borehole section in which logging tools can be conveyed by gravity. Typically, these are vertical sections or sections of boreholes that are within 60 degrees from vertical. Accordingly, downhole tractors are not required to move logging tools through a gravity-conveyed section of a borehole. The downhole tractors can be open-hole tractors and the borehole can be an open-hole borehole. Downhole tractors, especially the open-hole tractors, are relatively expensive and high maintenance tools that are generally only employed when truly needed to move a tool or device downhole; such as in horizontal boreholes or sections of boreholes that are greater than 60 degrees from vertical. In contrast, the methods disclosed herein employ a downhole tractor to convey tools in a borehole where gravity can be used for conveyance, i.e., in a gravity-conveyed sections of boreholes. For example, the methods disclosed herein can employ an open-hole tractor in a gravity-conveyed section of a borehole to eliminate, or at least reduce the effect of stick slip on obtaining logging data and therefore improve log quality.

Figure 1A:
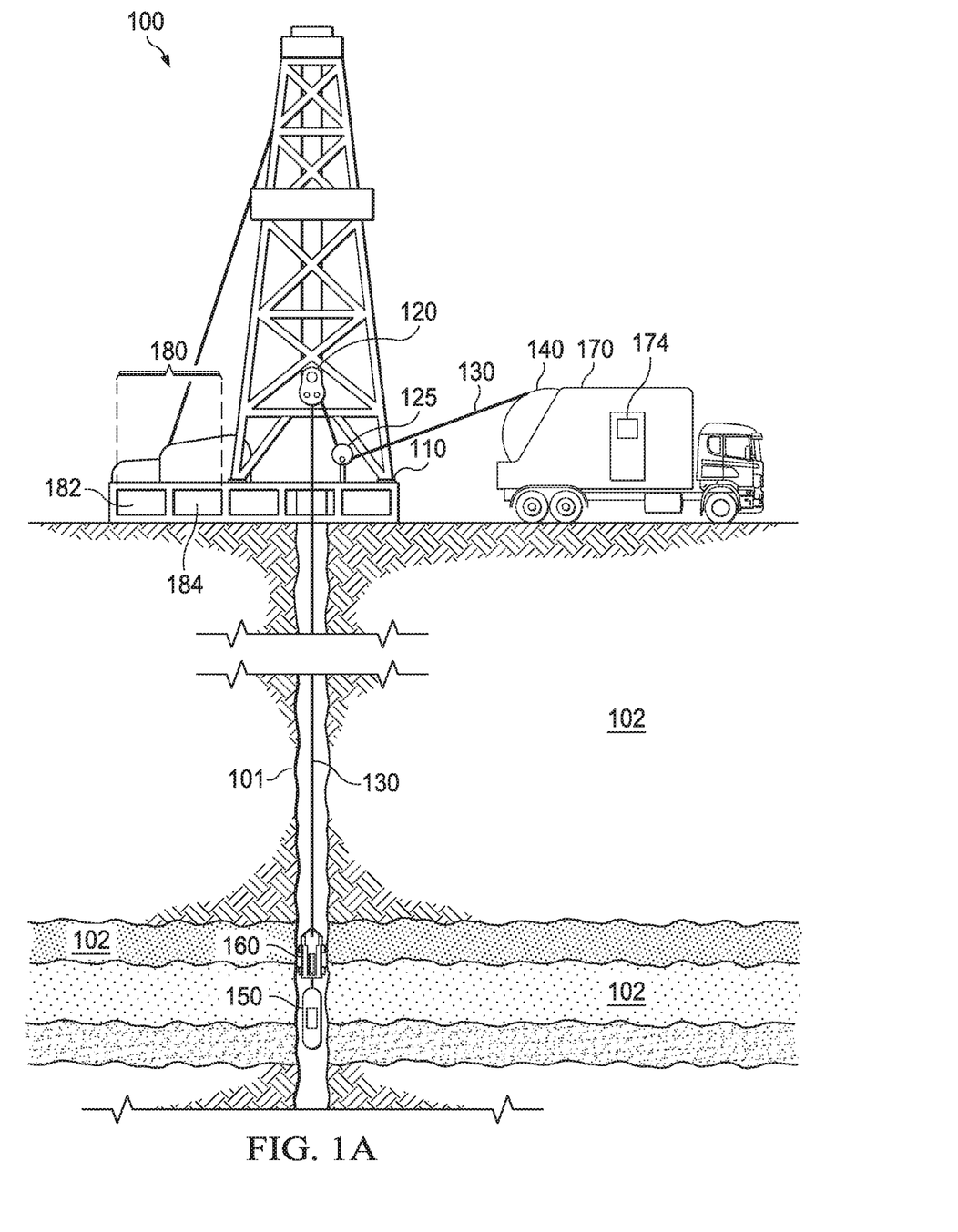
FIG. 1A illustrates a diagram of an example of a well system having an open borehole.
Figure 1B:
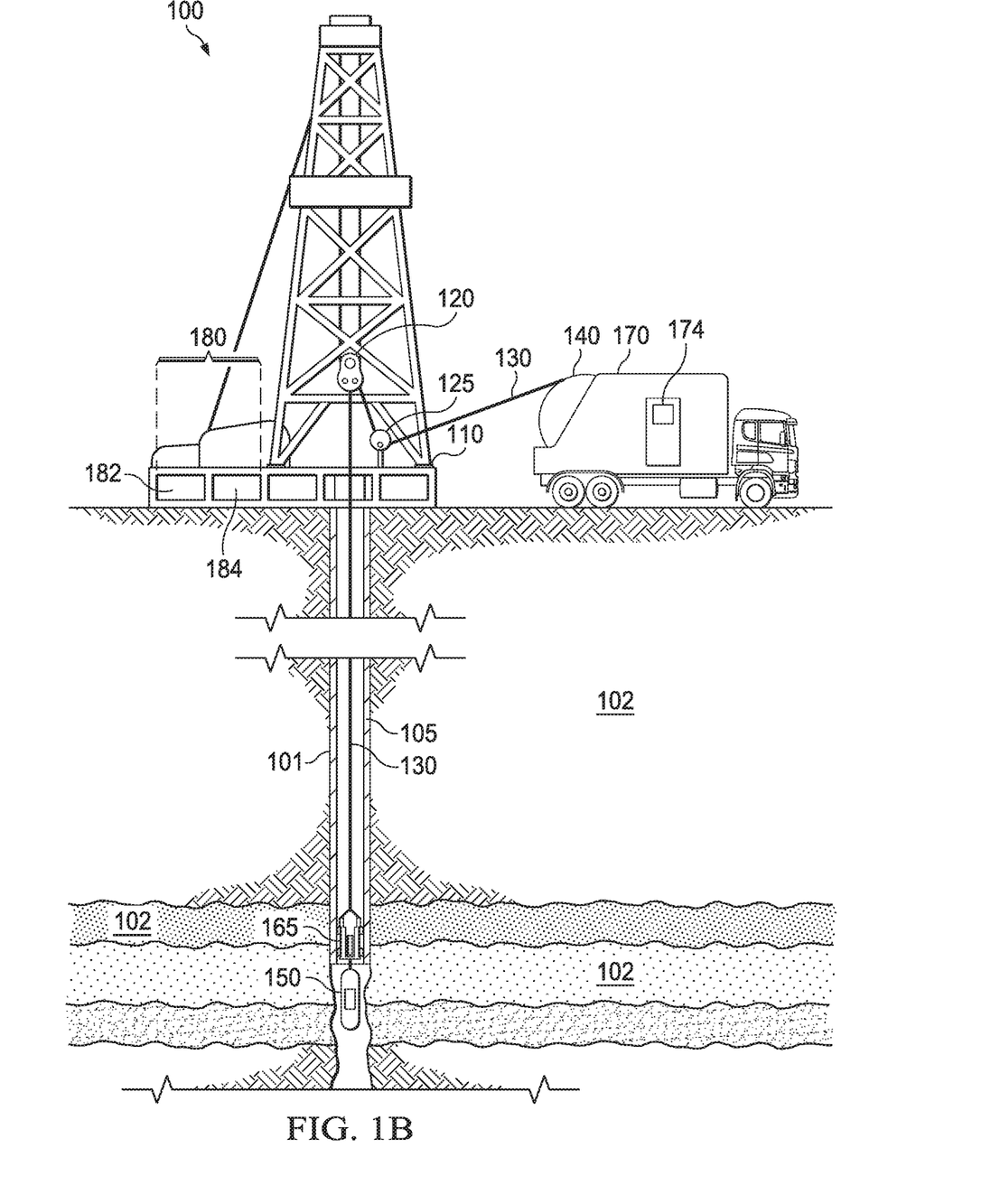
FIG. 1B illustrates a diagram of an example of a well system having a partially cased borehole.

FIG. 1A illustrates a diagram of an example of a well system 100 having a borehole 101. After drilling of borehole 101 is complete, it may be desirable to know more details of the types of subterranean formations 102 and the associated characteristics through information obtained by logging tools. The well system 100 is a wireline system configured to perform such formation testing and sampling for the borehole 101. In FIG. 1A, the borehole 101 is an uncased borehole and referred to herein as an open borehole. The borehole 101 can also be cased or partially cased and have portions that are open. For example, in FIG. 1B borehole 101 is partially cased with casing 105. Borehole 101 is also a vertical hole that is an example of a gravity-conveyed borehole section wherein tools, such as logging tools that form part of a wireline logging operation, can be attached to a wireline and conveyed downhole by gravity. Accordingly, a powered conveyance device, such as a tractor, is not needed in the borehole 101 to convey tools downward as in some borehole sections, such as a horizontal portion.

Well system 100 includes a derrick 110 that supports a traveling block 120, a sheave 125, and a wireline or logging cable 130. The logging cable 130 is coupled to a winch 140. The logging cable 130 supports a logging tool 150, also referred to as a probe or a sonde, and a tractor 160 that is coupled to the logging tool 150. The tractor 160 can be an open-hole tractor or a cased-hole tractor. For FIG. 1A, an open-hole tractor is used and referred to hereafter as open-hole tractor 160. For FIG. 1B, a cased-hole tractor 165 is provided as an example of another type of downhole tractor that can be employed similarly to the open-hole tractor 160 in FIG. 1A as discussed herein.

The logging tool 150 and open-hole tractor 160 can be lowered into the borehole 101 by gravity. The logging tool 150 can be lowered to the bottom of the borehole 101 or a region of interest of the borehole 101 and subsequently pulled upward by the winch 140 at a substantially constant speed to obtain logging data of the subterranean formation around the borehole 101. The open-hole tractor 160 can also be activated and employed to work with the winch 140 in raising the logging tool 150. As such, the open-hole tractor 160 can absorb stick-slip from the logging cable 130 while the logging tool 150 is being raised. The open-hole tractor 160 can also be used to assist in lowering the logging tool 150 if problems arise when lowering by gravity. For example, borehole 101 may include portions that are washed out (substantially larger than the drill bit size) or obstructed by portions of the formation that have swelled or extruded into the borehole 101 after drilling, leaving the borehole 101 partially undersized and obstructed. These discontinuities may cause difficulty in conveying the logging tool 150 past them, especially as the deviation increases beyond 45 degrees. In a truly vertical well, the weight of a tool string is available for pushing past obstacles. As the deviation increases, the gravity conveyance force decreases as only the gravity vector force in the direction of the borehole 101 is available for conveyance. The open-hole tractor 160 can be used to provide additional force above the available gravity conveyance force to push past these difficult sections. The open-hole tractor 160 can also be used to mitigate stick-slip while the logging tool 150 is obtaining logging data while being lowered in the borehole 101. Since some logging tools are designed to log in either direction, while being lowered or raised, the open-hole tractor 160 can also be used in a gravity conveyed section to mitigate stick slip while logging down. Accordingly, the elimination, or at least reduction of the effect of stick slip on obtaining logging data as disclosed herein can be employed to improve log quality in either direction.

Consider for example that the logging cable 130 has a stretch coefficient of 0.63 ft/kft/klb (wherein 1 foot=0.3048 meters and 1 pound=0.453 kilograms), there is 20,000 feet of the logging cable 130 in the borehole 101, the conveyance force (buoyant weight of the logging tool 150 and the drag to convey the logging tool 150 upwards) equals 3000 pounds, and ignoring the hanging weight of the logging cable 130, the amount of stretch due to the conveyance force is 0.63 ft/kft/klb*20 kft*3 klb=37.8 feet of stretch. If the conveyance force increases by 100 pounds to 3100 pounds, then the stretch due to the conveyance force is now 0.63 ft/kft/klb*20 kft*3.1 klb=39.06 feet. The logging cable 130 acts like a spring and the winch 140 is pulling on one end of it. The conveyance force drives the tension required in the spring and for the spring force to change, the length of the spring has to change as is well known and described by Hooke's law. In this example there is a small change in conveyance force and the winch 140 must move 39.06 feet minus 37.8 feet=1.26 feet (or 0.384 meters) before the spring stretches enough to move the logging tool 150 at the higher conveyance force. The depth measurement comes from the movement of the logging cable 130 at the surface, where the 1.26 feet of movement would be measured. During that time the logging tool 150 may be stationary and making periodic measurements at the same depth in the formation. If there is no depth correction, then those measurements of the same spot in the formation will be allocated to depths across that 1.26 feet of depth change measured at the surface. Once the logging tool 150 slips free and, assuming the conveyance force goes back to the previous 3000 pounds, then the spring will accelerate the logging tool 150 upward at a speed greater than the speed the winch 140 is moving until the system dynamics allow the stretch to return to the steady 37.8 feet of stretch consistent with the now 3000 pound conveyance force. The measurement point of the logging tool 150 will not be synchronized with the depth measured by the winch 140 until the system reaches equilibrium. This depth offset skews the log data and is especially detrimental to imaging tools or tools that make measurements of a small volume or distance along the borehole 101.

The logging tool 150 can be one of multiple types of logging tools. For example, the logging tool 150 can be a resistivity imaging tool, a magnetic resonance logging tool, such as a nuclear magnetic resonance tool, an acoustic sensing tool, a tool measuring natural or reflected radioactivity such as a density tool, and/or other types of logging tools that are employed to evaluate formations and/or fluids downhole. Multiple logging tools can be attached to the logging cable 130 and the open-hole tractor 160 and employed at the same time to form part of a tool string that is used for the wireline logging operation.

The logging tool 150 can be coupled to the open-hole tractor 160 via a rigid connection. As illustrated in FIG. 1A, the logging tool 150 and the open-hole tractor 160 can be mounted together. A mechanical interface, such as a field joint, can be used for directly connecting the two devices. A field joint is a mechanical and electrical connection used to connect tools or tool sections together at the rig site. Logging tools typically have a mating field joint at their uphole and downhole ends, allowing tools with compatible field joints to be operably connected as desired. The logging tool 150 and open-hole tractor 160 can be directly connected together when both use the same field joint. If the logging tool 150 and open-hole tractor160 have a different type of field joint, an adapter may be used to connect them. The logging tool 150 and the open-hole tractor 160 can be separated by the length of the mechanical interface. In FIG. 1A, the open-hole tractor 160 is connected to the logging cable 130 via a cable head and the logging tool 150 is connected to the open-hole tractor 160. In other examples, the open-hole tractor 160 can be positioned below the logging tool 150 and coupled to the logging cable 130 via the logging tool 150.

The logging data generated by the logging tool 150 can be communicated to a surface logging facility 170 for storage, processing, analysis, and/or display. The logging data can be transmitted via the logging cable 130 to the logging facility 170 while the logging tool 150 is in the borehole 101. The logging data may also be obtained once the logging tool 150 reaches the surface if the tool string includes a memory storage function.

The logging facility 170 includes electronic equipment 174, including processors for various types of signal processing and a display for visually representing data. The electronic equipment 174 can be configured to perform the storage, processing, analysis, and/or display of the logging data. The electronic equipment 174 can also be configured to initiate the logging tool 150 for logging operations and activate the open-hole tractor 160. The electronic equipment 174 can send activation signals and power via the logging cable 130 to initiate the logging tool 150 and activate the open-hole tractor 160. Activation of the open-hole tractor 160 can be based on detection of stick-slip. The winch 140 can be employed along with conventional detection methods to determine the occurrence of stick-slip. The electronic equipment 174 can then send a signal via the logging cable 130 to activate the open-hole tractor 160. The electronic equipment 174 can also activate the open-hole tractor 160 at the beginning of the logging operation. A series of operating instruction representing an algorithm can direct the operation of the electronic equipment 174 or at least a processor thereof. Well system 100 may further include a controller 180 that directs operation of the well system 100. The controller 180 includes a processor 182 and a memory 184 that are employed for controlling the well system 100. The controller 180 can employ the logging data, before or after processing, to develop or alter operations for the borehole 101.

By employing the open-hole tractor 160 during operation of the logging tool 150, the electronic equipment 174 can reduce the amount of processing needed to compensate for stick-slip since the measurement point of logging tool 150 is synchronized with the depth measured at the winch 140. For example, employing a rigid connector, the open-hole tractor 160 is stiffly connected to the logging tool 150 and the 100 pounds of conveyance force change noted in the above example would amount to an inconsequential depth change where the spring constant is very high. The logging operation can be run at 30 ft/min and the average conveyance force can be 3000 pounds. The open-hole tractor 160 can be capable of providing 1000 pounds of conveyance force and the winch 140 can be run to carry the average 3000 pound conveyance force at 30 ft/min while simultaneously running the open-hole tractor 160 at 30 ft/min. At the nominal 3000 pounds of conveyance force the open-hole tractor 160 would be coasting and neither pushing nor pulling a load as the winch 140 carries the average load. When the conveyance force increases to 3100 pounds, the extra 100 pounds would be carried by the open-hole tractor 160, the logging cable 130 would still carry the same 3000 pounds of force, and the logging tool 150 would be carried through the portion of the borehole 101 where the conveyance force varies at a constant speed, keeping the measurement point of logging tool 150 synchronized with the depth measured at the winch 140. Such synchronization provides an improvement to current logging practices.

Figure 2:
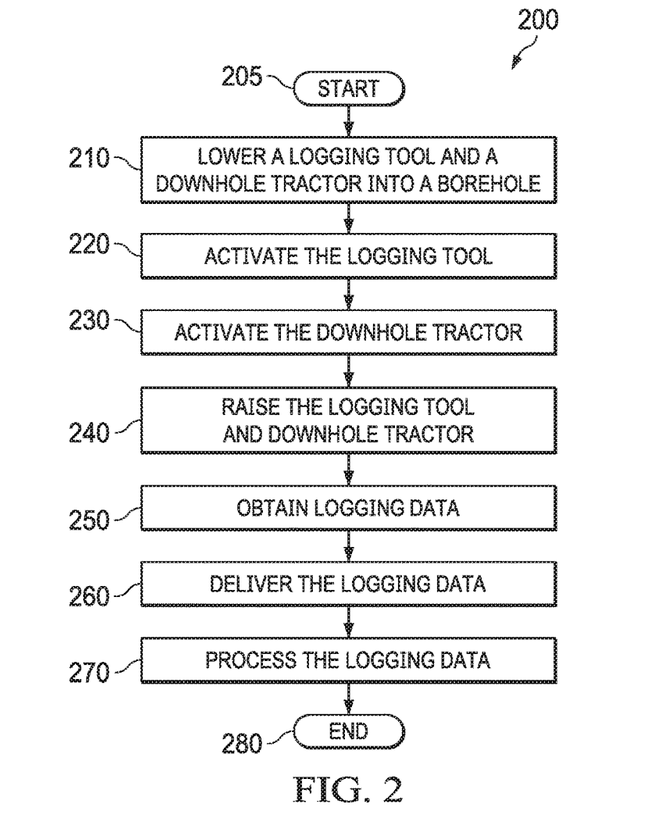
FIG. 2 illustrates a flow diagram of an example method of obtaining logging data of subterranean formations proximate a borehole.

FIG. 2 illustrates a flow diagram of an example method 200 of obtaining logging data of subterranean formations proximate a borehole. The borehole includes a gravity-conveyed borehole section, such as the borehole 101 of FIG. 1A and FIG. 1B. Additionally, at least a portion of the borehole is an open borehole. The method 200, or at least some of the steps thereof, can be performed by the well system 100 of FIG. 1A or FIG. 1B. The method 200 begins in a step 205.

In a step 210, a logging tool and a downhole tractor are lowered into the borehole. The logging tool is coupled to both the downhole tractor and a logging cable that is typically attached to a winch. The logging tool and the downhole tractor can be lowered in the borehole by operating the winch to run the logging cable into the borehole and allowing the logging tool to descend by the force of gravity. The downhole tractor can be activated to assist with the descent of the logging tool if needed. For example, if the logging tool becomes hung-up in the borehole during the descent due to discontinuities as discussed above with respect to FIG. 1A. The logging tool can be lowered to the bottom of the borehole or at another depth of interest within the borehole. The downhole tractor can be an open-hole tractor or a cased-hole tractor.

The logging tool is activated in a step 220. The logging tool can be activated by sending a control signal and power through the logging cable or by another conventional method. After being activated, the logging tool is ready to obtain logging data from the borehole. For example, the logging tool can be a resistivity imaging tool having pads that are extended against the inner wall of the borehole when the imaging tool is activated. The logging tool can obtain logging data while being lowered or when being raised.

In a step 230, the downhole tractor is activated. The tractor can also be activated by sending a control signal and power through the logging cable or by another conventional method. After being activated, the downhole tractor is ready to propel itself through the borehole. For example, the downhole tractor can ascend the borehole in conjunction with the logging cable and winch for the ascent. When activated the downhole tractor can extend wheels or tracks against the inner wall of the borehole that are then used to propel the downhole tractor within the borehole.

The downhole tractor can be activated at various times. The downhole tractor can be activated before the logging process, such as during the descent or ascent, or during the logging process when the logging tool is being lowered or raised. The downhole tractor can be activated in response to when stick-slip is experienced. For example, stick-slip may occur during the logging process at a certain depth within the borehole. The logging tool can then be lowered below the desired section, or at least below where the stick-slip started, and then the downhole tractor is activated and used to help convey the logging tool through the troubled section again at a constant velocity to obtain logging data. The amount of time needed to lower the logging tool can allow enough time, for example 30 to 60 seconds, for the downhole tractor to be activated for operation.

The downhole tractor can also be activated based on when stick-slip is expected. Information about the condition of the borehole can be used to indicate when stick-slip may occur. For example, an indication of a narrow portion of the borehole at a certain depth can be determined during the descent of the logging tool. This information can then be used to activate the downhole tractor during the ascent of the logging tool before that depth is reached. In some boreholes, the downhole tractor may not need to be activated for a steady ascent of a gravity-conveyed borehole.

In addition to control commands, the downhole tractor can require a significant amount of power to be delivered downhole via the logging cable for operation. Additionally, when operating the downhole tractor the wheels or tracks are extended and can become damaged when traversing the borehole. As such, activating the downhole tractor only in response to experiencing or expecting stick-slip can reduce the overall exposure of the downhole tractor during the logging process and prevent additional maintenance. A processor or computer of a logging system, such as the computer 350 of FIG. 3, can initiate the control signals for activating and controlling the downhole tractor and for activating and controlling the logging tool.

The logging tool and downhole tractor are raised in the borehole in a step 240. The winch can be activated and the logging tool pulled up via the logging cable. The logging tool is typically raised at a constant speed to obtain logging data that can be plotted versus the depths of the borehole. A steady ascent solely employing the logging cable, however, may not be possible due to stick-slip. To reduce or eliminate the effect of stick-slip on the logging data, the downhole tractor can be used to control the ascent. Both the tractor and the logging cable via the winch can supply a force to move the logging tool through the borehole. Changes in the force used to raise the logging tool can be absorbed by the downhole tractor rather than delivered to the logging tool through the logging cable.

In a step 250, logging data is obtained as the logging tool is raised. The logging data can be imaging data of the subterranean formations. Employing the tractor with the logging cable can provide a steady ascent of the logging tool such that the obtained logging data can be accurately logged at the depth that it was obtained. Logging data can also be obtained during the descent. In such examples, the downhole tractor can also be used to control the descent when obtaining logging while being lowered.

The logging data is delivered in a step 260. The logging data can be delivered once the logging tool reaches the surface or via the logging cable while the logging tool is in the borehole. The logging data can be delivered to a logging facility, such as the logging facility 170 of FIG. 1A and FIG. 1B, for processing. In a step 270, the logging data is processed. Processing of the logging data can include correlating the logging data with a depth of the borehole in which the data was obtained. A processor, such as one of the logging facility, can be employed for the processing. Since the effects of stick-slip on the log may be compensated for during the gathering of the logging data, the processor would not have to perform additional computations to attempt to compensate for stick-slip correlating the logging data with depths of the borehole. Often the attempts to minimize the effect stick slip has on log quality will fall short of the results obtainable had the stick slip been prevented. The method 200 proceeds to a step 280 and ends.

Figure 3:
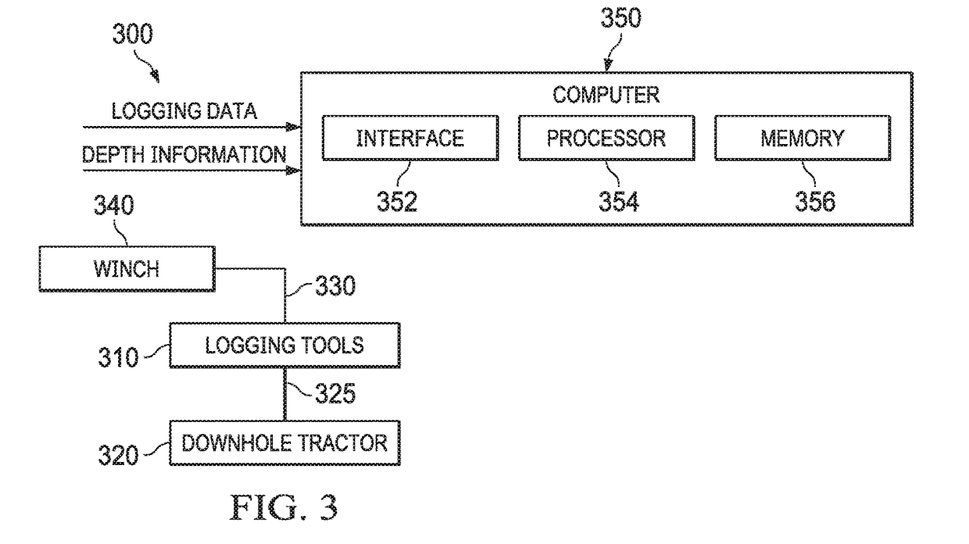
FIG. 3 illustrates a block diagram of an example of a logging system.

FIG. 3 illustrates a block diagram of an example of a logging system 300 constructed according to the principles disclosed herein. The logging system 300 includes logging tools 310, a downhole tractor 320, a logging cable 330, and a winch 340. The logging tools 310 are configured to obtain logging data from a borehole and the downhole tractor 320 is configured to propel itself through the borehole. The logging tools 310 can be different types of logging devices that are employed downhole as a tool string to gather formation or fluid data associated with the borehole. One of the logging tools 310 can be, for example, logging tool 150 of FIGS. 1A and 1B. Instead of multiple logging tools, a single logging tool can be employed in some examples.

The downhole tractor 320 can be coupled to the logging tools 310 via a connector 325. The connector 325 can be a rigid connector that is configured to fix the logging tools 310 to the downhole tractor 320. A field joint is an example of a rigid connector. In some examples, the connector 325 can be a flex sub or other similar type of connector that is less rigid than a field joint along its length and allow the tool string to bend (flex) in that area. In FIG. 3, the downhole tractor 320 is located downhole from the logging tools 310. The downhole tractor 320 can also be located uphole of the logging tools 310. In some examples, the downhole tractor 320 can be located between multiple logging tools 310. As such, more than one connector 325 can be used to couple the downhole tractor 320 to the logging tools 310. Regardless the orientation of the logging tools 310 and the downhole tractor 320, both are connected to the winch 340 via the logging cable 330. The winch 340 can be activated to employ the logging cable 330 to raise the logging tools 310 and the downhole tractor 320 from a lower depth of the borehole to the surface. The logging cable 330 can also be used to lower the logging tools 310 and the downhole tractor 320 in the borehole via the force of gravity. The winch 340 can be located at the surface of the borehole. The logging cable 330 and the winch 340 can be, for example, the logging cable 130 and winch 140 of FIGS. 1A and 1B. The borehole can be an open-hole borehole, a cased borehole, or a partially cased borehole, and the downhole tractor 320 can be an open-hole tractor, such as open-hole tractor 160 of FIG. 1A, or a cased-hole tractor, such as cased-hole tractor 165 in FIG. 1B.

The system also includes a computer 350 located at the surface. For example, the computer 350 can be part of the electronic equipment 174 of FIG. 1A. The computer 350 can be programmed to perform or control parts of the algorithms represented in the workflows described herein; for example the workflow of FIG. 2. As such, the computer 350 can be configured to control the operations of the logging tools 310 and the downhole tractor 320. The computer 350 can also be configured to process and analyze the logging data from the logging tools 310. For example, the computer 350 can receive the logging data obtained by the logging tools 310, receive depth measurements from the winch 340, and correlate the logging data with the depths of the borehole in which the logging data was obtained.

The computer 350 includes an interface 352 that is configured to receive the logging data and depth measurements. The logging data can be imaging data obtained by the logging tools 310. Different types of measurements can be obtained depending on the type of logging tools 310. For example, the logging tools 310 can obtain imaging data via resistive, acoustic, or magnetic resonance measurements. The computer 350 also includes a processor 354 configured to employ the logging data to provide a log of the borehole. The processor 354 can advantageously process the logging data and the depth measurements to provide the log without compensating for stick-slip since the downhole tractor 320 was employed when obtaining the logging data.

The computer 350 also includes a memory 356. The memory 356 can be a non-volatile memory that stores operating instructions to direct the operation of the processor 354. The operating instructions can correspond to algorithms such as those that are used to direct the work flow of FIG. 3. The memory 356 can also store various borehole information that can be employed to generate a well log for the borehole. The borehole log can be provided to a user or well operator and used to make operating decisions for future drilling associated with the borehole.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein. While the descriptions above have focused on open hole applications, those skilled in the art will also recognize that similar devices, concepts, and procedures might also be employed in a cased hole.

Aspects Disclosed Herein Include:

A. A method of obtaining logging data of subterranean formations associated with a borehole, including: (1) conveying a logging tool and downhole tractor through a gravity-conveyed section of a borehole, and (2) obtaining logging data from the logging tool during the conveying, wherein the downhole tractor is employed for at least a portion of the obtaining of the logging data.

B. A method of obtaining logging data in an open borehole, including: (1) lowering a logging tool and an open-hole tractor through a gravity conveyed section of an open borehole, (2) raising the logging tool and the open-hole tractor through the gravity conveyed section, (3) obtaining, from the logging tool during the raising, logging data associated with the gravity conveyed section of the open borehole, and (4) employing the open-hole tractor for at least a portion of the raising of the logging tool during the obtaining.

C. A logging system for gravity-conveyed sections of a borehole, including: (1) a logging tool configured to obtain logging data from a gravity-conveyed section of a borehole, (2) a downhole tractor connected to the logging tool, (3) a logging cable coupled to the logging tool and the downhole tractor, and (4) a computer configured to generate images that correspond to depths of the gravity-conveyed section of the borehole by processing the logging data obtained by moving the logging tool in the gravity-conveyed section of the borehole employing both the downhole tractor and the logging cable.

Each of aspects A, B, and C can have one or more of the following additional elements in combination: Element 1: wherein the conveying includes lowering and raising the logging tool and the downhole tractor in the borehole employing a winch, and the obtaining occurs during the raising of the logging tool and the downhole tractor. Element 2: further comprising activating the downhole tractor during the raising. Element 3: wherein the activating the downhole tractor is in response to stick-slip during the raising. Element 4: wherein the activating the downhole tractor is in response to expected stick-slip in the gravity-conveyed section of the borehole. Element 5: wherein the downhole tractor is activated and employed throughout the obtaining. Element 6: wherein the logging tool is a resistivity imaging tool. Element 7: wherein at least a portion of the borehole is an open borehole and the downhole tractor is an open-hole tractor. Element 8: wherein the downhole tractor is rigidly connected to the logging tool. Element 9: further comprising activating the open-hole tractor and the logging tool before the obtaining. Element 10: further comprising activating the open-hole tractor during the obtaining. Element 11: wherein the activating of the open-hole tractor is in response to experiencing stick-slip at a section of the open borehole during the raising. Element 12: further comprising lowering the logging tool below the section, raising the logging tool through the section employing the open-hole tractor, and obtaining logging data through the section. Element 13: wherein the logging tool is a resistivity imaging tool having pads that are extended against an inner wall of the open borehole for obtaining the logging data. Element 14: further comprising a winch that raises and lowers the logging tool and the downhole tractor in the gravity-conveyed section of the borehole via the logging cable, and provides measurements of the depths. Element 15: wherein the borehole is an open borehole and the downhole tractor is an open-hole tractor. Element 16: wherein the logging tool is a resistivity imaging tool. Element 17: wherein the computer generates the images employing the measurements and without adjusting for stick-slip.

What is claimed is:

1. A method of obtaining logging data of subterranean formations associated with a borehole, comprising:
   conveying a logging tool and downhole tractor through a gravity-conveyed section of a borehole, wherein the conveying includes raising the logging tool and the downhole tractor in the borehole;
   activating the downhole tractor during the raising; and
   obtaining logging data from the logging tool during the raising of the logging tool and the downhole tractor.

2. The method as recited in claim 1, wherein the conveying further includes lowering the logging tool and the downhole tractor in the borehole, and the conveying includes employing a winch for the lowering and the raising.

3. The method as recited in claim 1, wherein at least a portion of the borehole is cased and the downhole tractor is a cased-hole tractor.

4. The method as recited in claim 1, wherein the activating the downhole tractor is in response to stick-slip during the raising.

5. The method as recited in claim 4, wherein the activating the downhole tractor is in response to expected stick-slip in the gravity-conveyed section of the borehole.

6. The method as recited in claim 1, wherein the downhole tractor is activated and employed throughout the obtaining.

7. The method as recited in claim 1, wherein the logging tool is a resistivity imaging tool.

8. The method as recited in claim 1, wherein at least a portion of the borehole is an open borehole and the downhole tractor is an open-hole tractor.

9. The method as recited in claim 1, wherein the downhole tractor is rigidly connected to the logging tool.

10. A method of obtaining logging data in an open borehole, comprising:
    lowering a logging tool and an open-hole tractor through a gravity conveyed section of an open borehole;
    raising the logging tool and the open-hole tractor through the gravity conveyed section;
    obtaining, from the logging tool during the raising, logging data associated with the gravity conveyed section of the open borehole; and
    employing the open-hole tractor for at least a portion of the raising of the logging tool during the obtaining.

11. The method as recited in claim 10, wherein the logging tool is a resistivity imaging tool having pads that are extended against an inner wall of the open borehole for obtaining the logging data.

12. The method as recited in claim 10, further comprising activating the open-hole tractor during the obtaining.

13. The method as recited in claim 12, wherein the activating of the open-hole tractor is in response to experiencing stick-slip at a section of the open borehole during the raising.

14. The method as recited in claim 13, further comprising lowering the logging tool below the section, raising the logging tool through the section employing the open-hole tractor, and obtaining logging data through the section.

15. The method as recited in claim 10, further comprising activating the open-hole tractor and the logging tool before the obtaining.

16. A logging system for gravity-conveyed sections of a borehole, comprising:
    a logging tool configured to obtain logging data from a gravity-conveyed section of a borehole;
    a downhole tractor connected to the logging tool;
    a logging cable coupled to the logging tool and the downhole tractor;
    a winch configured to raise and lower the logging tool and the downhole tractor in the gravity-conveyed section of the borehole via the logging cable; and
    a computer configured to generate images that correspond to depths of the gravity-conveyed section of the borehole by processing the logging data without adjusting for stick-slip, wherein the logging data is obtained and an affect of stick-slip is eliminated from the logging data by raising the logging tool in the gravity-conveyed section of the borehole in a steady ascent employing both the downhole tractor and the logging cable.

17. The logging system as recited in claim 16, wherein the borehole is an open borehole and the downhole tractor is an open-hole tractor.

18. The logging system as recited in claim 16, wherein the logging tool is a resistivity imaging tool.

19. The logging system as recited in claim 16, wherein the winch is further configured to provide measurements of the depths.

20. The logging system as recited in claim 19, wherein the computer generates the images employing the measurements and without adjusting for stick-slip.

* * * * *